(12) United States Patent
Livshits

(10) Patent No.: US 7,290,251 B2
(45) Date of Patent: Oct. 30, 2007

(54) METHOD AND SYSTEM FOR PROVIDING A REPRESENTATION OF MERGE CONFLICTS IN A THREE-WAY MERGE OPERATION

(75) Inventor: Artem Y. Livshits, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 644 days.

(21) Appl. No.: 10/440,339

(22) Filed: May 16, 2003

(65) Prior Publication Data

US 2004/0230886 A1   Nov. 18, 2004

(51) Int. Cl.
G06F 9/44 (2006.01)
G06F 15/00 (2006.01)

(52) U.S. Cl. .................. 717/143; 715/511; 715/512
(58) Field of Classification Search ............ None
See application file for complete search history.

(56) References Cited

U.S. PATENT DOCUMENTS

| | | | |
|---|---|---|---|
| 4,445,795 A | 5/1984 | Levine et al. | |
| 4,674,040 A | 6/1987 | Barker et al. | |
| 5,828,885 A * | 10/1998 | Raman | 717/137 |
| 6,016,494 A | 1/2000 | Isensee et al. | |
| 6,061,698 A | 5/2000 | Chadha et al. | |
| 6,438,543 B1 | 8/2002 | Kazi et al. | |
| 6,507,856 B1 | 1/2003 | Chen et al. | |
| 2003/0212712 A1* | 11/2003 | Gu et al. | 707/200 |
| 2004/0177343 A1* | 9/2004 | McVoy et al. | 717/122 |
| 2004/0205539 A1* | 10/2004 | Mak et al. | 715/511 |

OTHER PUBLICATIONS

Tang, Xiaoping, Tia, Ruiqi, and Wong, D.F., "Fast Evaluation of Sequence Pair in Block Placement by Longest Common Subsequence Computation Computation", Dec. 2001, IEEE, vol. 20, No. 12, pp. 1406-1413.*
Myers, "An O(ND) Difference Algorithm and Its Variations," *Algorithmica #2* 1986, 15 pages.

* cited by examiner

*Primary Examiner*—Tuan Dam
*Assistant Examiner*—Andrew Y Chou
(74) *Attorney, Agent, or Firm*—Lee & Hayes, PLLC

(57) ABSTRACT

A method and system provides an improved representation of merge conflicts in a three-way merge operation of three sequences: Original, Version1, and Version2. A merge program first compares the three sequences to identify a list of difference chunks of elements between the Original and Version1, and a list of difference chunks between the Original and Version2. From the two sets of difference chunks, the merge program creates an annotated list of chunks. Each chunk in the annotated list is identified by a conflict flag that indicates whether the chunk is a part of a conflict and if it is, what sequence(s) being merged it belongs to. A merged document is then constructed based on the annotated list of chunks, with the chunks identified in the merged document with conflict markers for viewing by a user.

27 Claims, 6 Drawing Sheets

METHOD AND SYSTEM FOR PROVIDING A REPRESENTATION OF MERGE CONFLICTS IN A THREE-WAY MERGE OPERATION

TECHNICAL FIELD

This invention relates generally to computer data processing, and more particularly to methods and systems for providing an improved representation of conflicts identified in the process of merging three sequences, such as the lines in three textual documents.

BACKGROUND OF THE INVENTION

A merge operation is a common editing operation for combining two or more textual documents or other types of sequences together. The documents to be merged may be, for example, different versions of software source code with modifications by different software developers, or different versions of a word-processing document edited on different machines. The documents to be merged typically contain some common parts and some parts that are different, and overlapping differences are viewed as conflicts that may require the input of a user to resolve the conflicts, i.e., picking the parts from the right version to be included in the final merged document. For instance, if the documents are source code files containing conflicting changes, the user would have to decide which changes are the correct ones that should be kept. To assist the user in resolving the conflicts, the editing application performing the merge has to be able to provide a representation of the differences and common parts of the documents being merged in a clear manner.

A three-way merge operation, as indicated by its name, has three sequences of elements as its inputs. Typically, the three sequences include one sequence designated as an original version ("the Original") and two versions, Version1 and Version2, that in many cases are derived from the original. For example, the three sequences may correspond to an original source code file, a first modified version of the source code with changes made by one developer, and a second modified version of the source code containing changes made by another developer. Conventionally, the representation of a conflict in a three-way merge operation of three textual documents involves an "original chunk" of text found in the original but not in its entirety in both Version1 and Version2, a "difference chunk" of text that is found in Version1 but not in the original, and a second difference chunk of text found in Version2 but not in the original. The user can then select, based on the conflict representation, the original chunk or either the difference chunk of Version1 or the difference chunk of Version2.

One problem with this conventional approach of representing conflicts in a three-way merge is that it does not provide sufficiently fine granularity in the comparison. For instance, it is common for the original chunk to share a substantial portion of text with either or both of the difference chunks of Version1 and Version2. The different chunks of Version1 and Version2 may also share some common parts. The real differences between any two of the three versions may be embedded in the conflicting chunks and require the user to closely examine the chunks to identify them. As a result, the conventional representation of conflicts in a 3-way merge can be confusing to the user and does not fully assist the user in identifying the real differences between the different versions in order to resolve the conflicts.

SUMMARY OF THE INVENTION

In view of the foregoing, the present invention provides methods and systems for providing an improved representation of merge conflicts in a three-way merge operation to enable a user to easily identify the common parts and differences in the conflicting chunks of elements in the three sequences being merged to resolve the conflicts. The three sequences being merged are designated as an "Original" sequence, a "Version1" sequence, and a "Version2" sequence. The sequences may, for example, be textual documents that have lines as their elements. In accordance with the invention, the merge program first compares the three sequences to identify a list of difference chunks of elements between the Original and Version1, and a list of difference chunks between the Original and Version2. From the two sets of difference chunks, the merge program creates an annotated list of chunks. Each chunk in the annotated list is identified by its source file (i.e., the file in which it is found), its location in the source file, and a conflict flag that indicates one of the following: (1) no conflict (i.e., the chunk either exists in all three versions or can be automatically taken from either Version1 or Version2); (2) "Original" (i.e., the chunk is a part of a conflict found only in the Original); (3) "Version1" (i.e., the chunk is a part of a conflict found only in Version 1); (4) "Version2" (i.e., the chunk is a part of a conflict found only in Version2); (5) "Original+Version1" (i.e., the chunk is a part of a conflict and a common part of the Original and Version1); (6) "Original+Version2" (i.e., the chunk is a part of a conflict and a common part of the Original and Version2); and (7) "Version1+Version2" (i.e., the chunk is a part of a conflict found in both Version1 and Version2). A merged document is then constructed based on this annotated list of chunks, with the chunks identified in the merged document with conflict markers according to their conflict flags for viewing by a user. Although the invention can be advantageously applied for presenting conflicts in a 3-way texture merge on a line-by-line basis, it can be applied for 3-way merge of sequences of other types, such as sequences of words (rather than lines) in the text, sequences of molecules in proteins, etc.

DETAILED DESCRIPTION OF THE INVENTION

Figure 1:
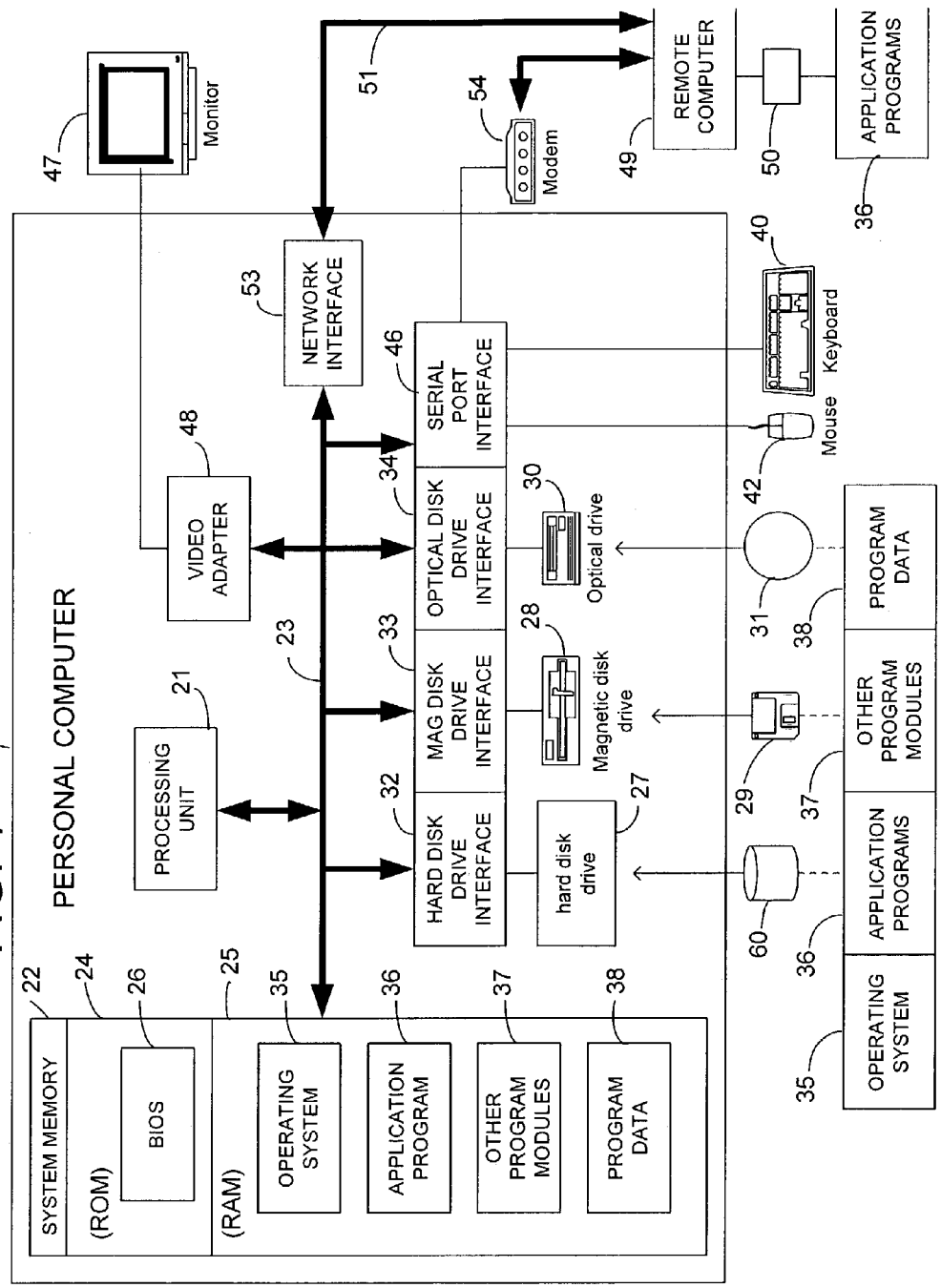
FIG. 1 is a block diagram generally illustrating an exemplary computer system on which an image pack service of the present invention may be implemented.

Turning to the drawings, wherein like reference numerals refer to like elements, the invention is illustrated as being implemented in a suitable computing environment.

Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may be practiced in distributed computing environments where tasks are performed by remote processing devices that are linked through a communications network. In a distributed computing environment, program modules may be located in both local and remote memory storage devices.

The following description begins with a description of a general-purpose computing device that may be used in an exemplary system for implementing the invention, and the image pack service of the invention will be described in greater detail with reference to FIGS. 2 and 3. Turning now to FIG. 1, a general purpose computing device is shown in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, storage area networks, and the like may also be used in the exemplary operating environment.

A number of program modules may be stored on the hard disk 60, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port a universal serial bus (USB) or a network interface card. A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various acts and operations described hereinafter may also be implemented in hardware.

Figure 2:
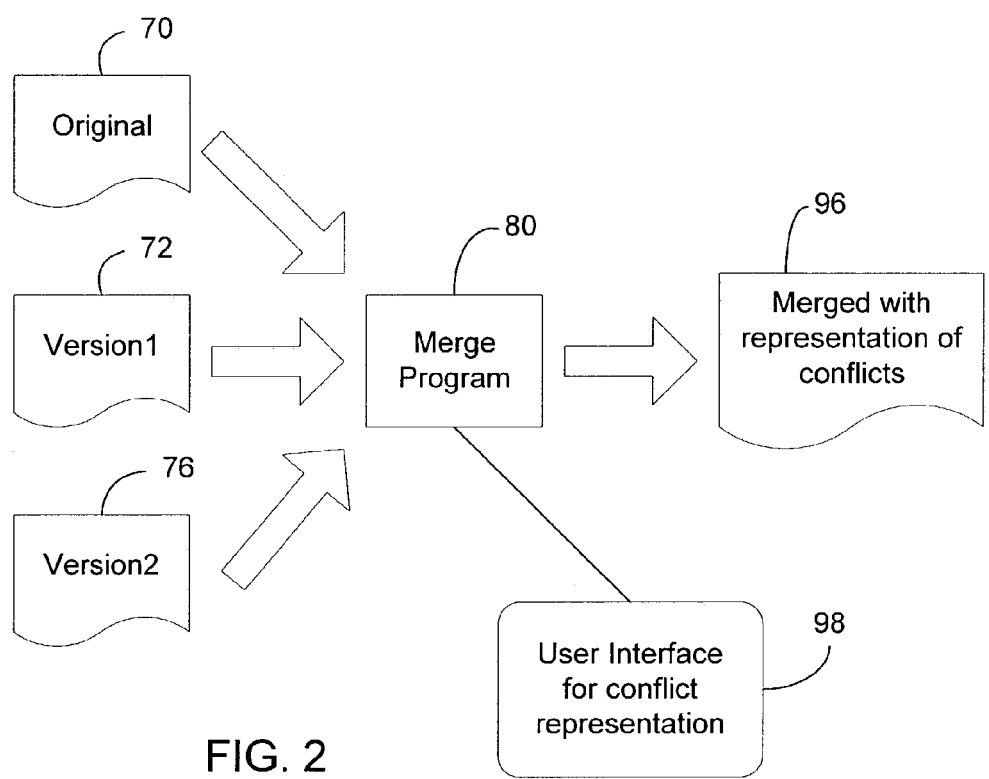
FIG. 2 is a schematic diagram illustrating a merge operation in which an original document and two other versions are merged to generate a merged document.

Referring to FIG. 2, the present invention is directed to a method and system for providing a representation of conflicts encountered in a three-way merge operation. The three sequences to be merged include one sequence that, for convenience of reference, is designated as an "original" sequence 70, and two other sequences 72 and 76 that are typically different versions derived from the original sequence. It will be appreciated, however, that the two sequences 72 and 76 do not have to be derived from the "original" sequence 70, and the three sequences may actually be unrelated to and independent of each other. Each of the three sequences contains multiple elements. The three sequences may be textual documents, and in that case the elements of each document may be the lines of those documents. In other words, the operation of merging the documents may be performed on a line-by-line basis. In the following description, the merge operation is described in the context of merging three textual documents, and the three sequences 70, 72, 76 are hereinafter referred to as "documents." It will be appreciated, however, that the generation of a representation of merge conflicts in a three-way merge in accordance with the invention may be applied equally to other types of sequences. For instance, the same technique can be applied for 3-way merge of sequences of words (rather than lines) in textual documents, sequences of molecules in proteins, etc.

For ease of reference, the three documents 70, 72, and 76 involved in the merge operation are hereinafter referred to as the Original, Version1, and Version2, respectively. In this regard, it should be noted that the terms "Version1" and "Version2" are used only for the purpose of distinguishing the two derived versions and do not imply that the Version1 document is created or modified before the Version2 document. An example of the application of a 3-way merge operation in accordance with the invention may be the scenario in which an original version of a source code file and two later versions of the source code developed by two different developers are to be merged together to form one merged source code file. The merge operation is performed by a merge program 80, which compares the text of the three documents and identifies the common parts and differences among them and generates a merged document 96. The three documents may contain some common portions that are found in all three documents, as well as some different portions that may exist in one or two of the documents, but not all three. Some differences can be resolved automatically; and some differences are conflicts that have to be resolved by a user. To enable the user to make decisions as to which of the conflicting portions should be kept in a final document, a representation of the conflicts has to be formed and presented to the user. The representation may be included in the merged document 96 generated by the merge program 80. Alternatively, the representation may be displayed in a user interface screen on a video display 98 to allow the user to interactively resolve the conflicts while the merge program is running.

Generally, the 3-way conflict identification rule is as follows. If no changes happened to Version1's piece (i.e., the Original's piece equals Version1's piece), the merge program takes Version2's piece; else if changes happened to Version1's piece, but the Original's piece equals Version2's piece (i.e., Version2's piece was not changed), the merge program takes Version1's piece. If changes happened to both Version1's piece and Version2's piece and the two pieces are identical, then the merge program takes either one. Otherwise, different changes have happened to Version1's and Version2's pieces. In that case, the merge program determines that a conflict exists and may provide a representation of the conflict to the user to allow the user to resolve the conflict.

The conventional way to represent a conflict is for the merge program to present the entire conflicting chunks to the user. The conflicting chunks, however, may have common parts intermixed with different text lines. For instance, the conflicting chunk in Version1 may be substantially similar to the conflicting chunk in Version2. The conventional representation ignores this aspect and does not separate those common parts from the different lines. As a result, the different lines may be embedded in the common parts, and would require the user to carefully compare the presented conflicting chunks in order to recognize the differences. This significantly reduces the usefulness of the conflict representation.

In accordance with a feature of the invention, a significantly improved representation of conflicts in a 3-way merge operation is provided by identifying components in the conflicting chunks that are common to two of the three documents being merged. Specifically, the merge program 80 in accordance with the invention identifies common parts of the chunks of the Original and Version1, the Original and Version2, or Version1 and Version2, and indicates that those parts are common to the respective documents in the conflict representation.

To illustrate the benefit of the new conflict representation of the invention, an example is provided here. The contents of the three documents being merged in this example are shown in Table 1.

TABLE 1

Exemplary documents in a three-way merge.

| Original | Version1 | Version2 |
|---|---|---|
| Subject: Thank you<br>Thank you all. | Subject: Thank you<br>Dear Joe,<br>Thank you for your participation.<br>A $2 check will be sent to you.<br>John Smith. | Subject: Thank you<br>Dear Sam,<br>Thank you for your participation.<br>A $2 check will be sent to you.<br>John Smith. |

If the 3 documents are merged using a traditional approach to represent the conflicts, the resultant representation would be:

```
Subject: Thank you
>>>> ORIGINAL ++++++++++++++++++++++++++++++++++++++++++++++++
Thank you all.
==== VERSION1 ++++++++++++++++++++++++++++++++++++++++++++++++
Dear Joe,
Thank you for your participation.
A $2 check will be sent to you.
John Smith.
==== VERSION2 ++++++++++++++++++++++++++++++++++++++++++++++++
Dear Sam,
Thank you for your participation.
A $2 check will be sent to you.
John Smith.
<<<< END ++++++++++++++++++++++++++++++++++++++++++++++++
```

The part between ">>>>ORIGINAL" and "<<<<END" markers is a merge conflict that may be resolved manually by the user, and conflicting chunks from the versions are listed separately. However, as can be seen, the conflicting chunks of Version1 and Version2 actually have a substantial portion in common. It should also be noted that in this example each chunk of text is a collection of textual lines.

In contrast, in the new representation of the conflicts in accordance with the invention, the lines can be separated into a distinct chunk identified as common to both Version1 and Version2:

```
Subject: Thank you
>>>> ORIGINAL ++++++++++++++++++++++++++++++++++++++++++++++++++
Thank you all.
==== VERSION1 ++++++++++++++++++++++++++++++++++++++++++++++++++
Dear Joe,
==== VERSION2 ++++++++++++++++++++++++++++++++++++++++++++++++++
Dear Sam,
==== VERSION1&VERSION2 ++++++++++++++++++++++++++++++++++++++++++
Thank you for your participation.
A $2 check will be sent to you.
John Smith.
<<<< END +++++++++++++++++++++++++++++++++++++++++++++++++++++++
```

It can be seen that it is much easier for a user to see in this conflict representation how Version1 really differs from Version2.

To facilitate an understanding of the method of an embodiment of the invention to generate the conflict representation in a 3-way merge, several terms that will be used in the following description are defined here first.

1. A "subsequence" of a sequence is a sequence that can be obtained from the original sequence by deleting one or more elements from it.
2. A "common subsequence" of two sequences is a subsequence of both.
3. A "longest common subsequence" ("LCS") of two sequences is a common subsequence that is not a subsequence of any other common subsequence.
4. A "snake" is a subsequence of an LCS that is sequential and contiguous in both sequences.
5. A "piece" is a sequential subsequence of a sequence. Thus, a "snake" contains two "pieces," one from the first sequence and one from the other sequence.
6. A "difference chunk" is a pair of "pieces" in the corresponding sequences between "snakes" or before the first "snake" (if not empty) or after the last "snake" (if not empty). If there are no snakes, then the difference chunk spans both sequences (if not empty). A difference chunk does not contain elements that are common in both of its pieces.

A merge conflict may contain several common parts between difference chunks (i.e. Original-Version1, Original-Version2 or Version1-Version2). Although the concept of the invention does not impose any limitations on which common parts are separated into chunks (which should not be confused with the "difference chunks"), in a preferred embodiment the following requirements are applied:

1. Only one common part is separated into a distinct chunk (the longest).
2. The common part should be either at the beginning or at the end of the difference chunks
3. The common part should be long enough. In one implementation it should be longer than ⅔ of the longest of the participating chunks. For instance, if the common part is between the Original and Version1, then the common part should be longer than ⅔ of the longer one of the Original and Version1. Nevertheless, this ratio can be easily changed so it can be made ¾ or some other value. Alternatively, some limit on the absolute length of the common part can be imposed. For instance, the common part could be required to be longer than 32 lines.

The rationale behind the requirements is that additional common chunks, if too many, might clutter the view and complicate manual conflict resolution. The requirements are a simple heuristic that turns on the new conflict representation only when it is likely to simplify manual conflict resolution. The requirements #1 and #2 guarantee that the representation of a conflict can have at most 4 chunks of text, and there are 7 possible conflict combinations as listed in Table II.

TABLE II

Possible conflict combinations.

| I. | Original<br>Version1<br>Version2 | | | | |
|---|---|---|---|---|---|
| II. | Original + Version1<br><br>Original<br>Version1<br>Version2 | III. | Original<br><br>Version1<br>Original + Version1<br>Version2 | IV. | Original + Version2<br>Original<br>Version1<br>Version2 |
| V. | Original<br>Version1<br><br>Version2<br>Original + Version2 | VI. | Original<br>Version1 + Version2<br><br>Version1<br>Version2 | VII. | Original<br>Version1<br><br>Version2<br>Version1 + Version2 |

It is possible that in alternative implementations the requirement #2 will be relaxed, i.e. the common part may be allowed to be separated into a chunk for the representation even if it's in the middle. In such cases, however, the requirement #3 may be stricter, because if a common part is in the middle, the merge conflict contains 6 chunks and the common part should be really long enough so that folding it would justify adding 3 more chunks to the conflict.

Figure 3:
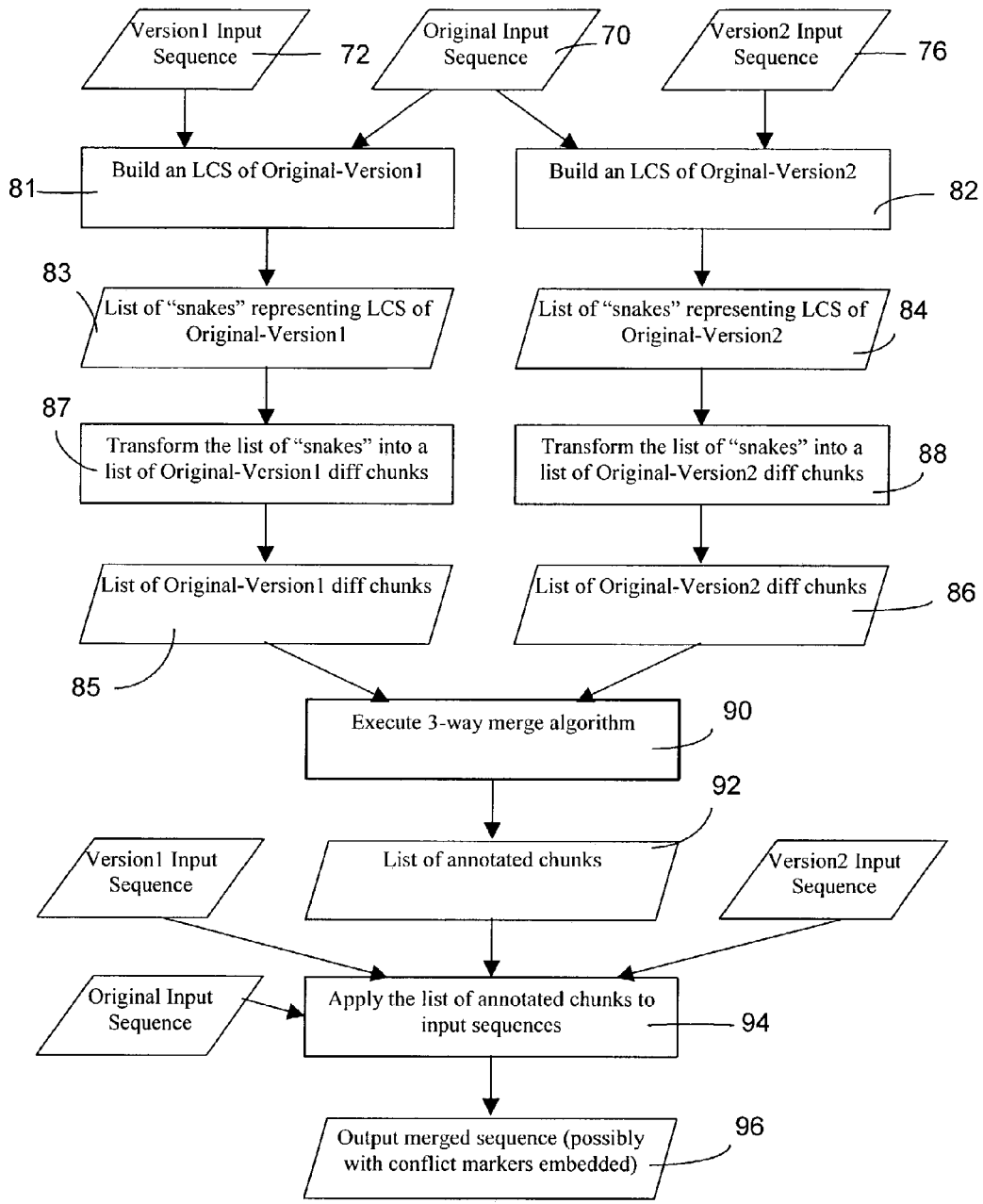
FIG. 3 is a flow diagram showing steps of a 3-way merge process of an embodiment of the invention.

Referring to FIG. 3, in a preferred embodiment of the invention, the 3-way merge operation generates the conflict representation from two sets of difference chunks: difference chunks between Original and Version1 and difference chunks between Original and Version2. To that end, the merge program 80 first calculates (steps 81 and 82) a longest common subsequence (LCS) of each of the two given textual files (as sequences of lines) and presents the output as a list of "snakes." As defined above, a "snake" is a subsequence of the LCS that is contiguous in both input sequences. The two lists 85 and 86 of difference chunks for the given two documents (Original-Version1 or Original-Version2) are then generated (steps 87, 88) from the lists 83 and 84 of "snakes," respectively.

By way of example, for two given sequences {0a,b,5,6c,d,3e,f} and {a,1,b,c,d,2e,f,}, the LCS is {a,b,c,d,e,f} and the list of "snakes" is {a}, {b}, {c,d}, {e,f}. In this implementation, a "snake" is represented as two pairs of line numbers (0-based): the first pair is the line numbers of the first element of the "snake" in the first and the second sequence correspondingly; and the second pair is the line numbers of the element just behind the "snake" in the first and the second sequence correspondingly. Thus, in the current example, the list of "snakes" is {(1,0)-(2,1)}, {(2,2)-(3,3)}, {(5,3)-(7,5)}, {(8,6)-(10,8)}. The algorithm that produces a list of "snakes" is based on the algorithm described in Eugene W. Myers, "An O(ND) Difference Algorithm and Its Variations," Algorithmica #2, 1986, 1:251-266.

One addition made to the algorithm described in this reference is that the list of "snakes" is always "bracketed." If the first "snake" is not at the beginning of both sequences, i.e., its first pair is not (0,0), then an empty "snake" of {(0,0)-(0,0)} is added at the beginning. Furthermore, if the last "snake" is not at the end of both sequences, i.e., its second pair is not (length1,length2), then an empty "snake" is added at the end. In the current example, the first snake is not at the beginning of both sequences, so an empty snake is added at the beginning. There is no need for an empty snake at the end in this case, because the second pair of the last snake is (10,8) which corresponds to the full lengths of the two sequences. A bracketed list of snakes for this example is {(0,0)-(0,0)}, {(1,0)-(2,1)}, {(2,2)-(3,3)}, {(5,3)-(7,5)}, {(8,6)-(10,8)}.

Given the list of "snakes" for the given pair of documents, a list of difference chunks for the pair can be easily calculated. Difference chunks, as defined above, are the lines between the "snakes." The "bracketing" as described above guarantees that the leading and tailing difference chunks are also enclosed between snakes. For the current example, the difference chunks is {(0,0)-(1,0)}, {(2,1)-(2,2)}, {(3,3)-(5,3)}, {(7,5)-(8,6)}.

Returning to FIG. 3, after the merge program generates the lists (85 and 86) of difference chunks, it then executes a 3-way textual merge algorithm (step 90) that generates a list 92 of annotated chunks from the two lists of difference chunks for Original-Version1 and Original-Version2. Each chunk in the annotated list is a quadruple [source file, {start-end}, conflict flags]. The source file can be one of the "Original", "Version1" or "Version2." The conflict flag may be one of the following seven labels:

1. "No conflict", meaning that the chunk is either found in all three documents or can be automatically taken from either Version1 or Version2.
2. "Original", meaning that the chunk is a part of a conflict found only in the Original.
3. "Version1", meaning that the chunk is a part of a conflict found only in Version1.
4. "Version2", meaning that the chunk is a part of a conflict found only in Version2,
5. "Original+Version1", meaning that the chunk is a part of a conflict found both in the Original and Version1.
6. "Original+Version2", meaning that the chunk is a part of a conflict found both in the Original and Version2.
7 "Version1+Version2", meaning that the chunk is a part of a conflict found both in Version1 and Version2.

Of these seven conflict flags, the first four have been used in conventional representation of conflicts in a three-way merge, while the last three conflict flags are added as a result of the invention. The resulting merged document file 96 is created (step 94) from the annotated list of chunks by reading the lines from 'start' to 'end'−1 from the appropriate source file and writing it to the resulting file for the merged document. Conflict markers for the chunks may be written into the merged document according to their conflict flags.

For example, the result of the 3-way textual merge algorithm applied to the sample documents in Table 1 is an annotated list of chunks that reads: ["Original", (0-1), "No conflict"], ["Original", (1-2), "Original"], ["Version1", (1-2), "Version1"], ["Version2", (1-2), "Version2"], ["Version1", (2-5), "Version1+Version2"].

Figure 4:
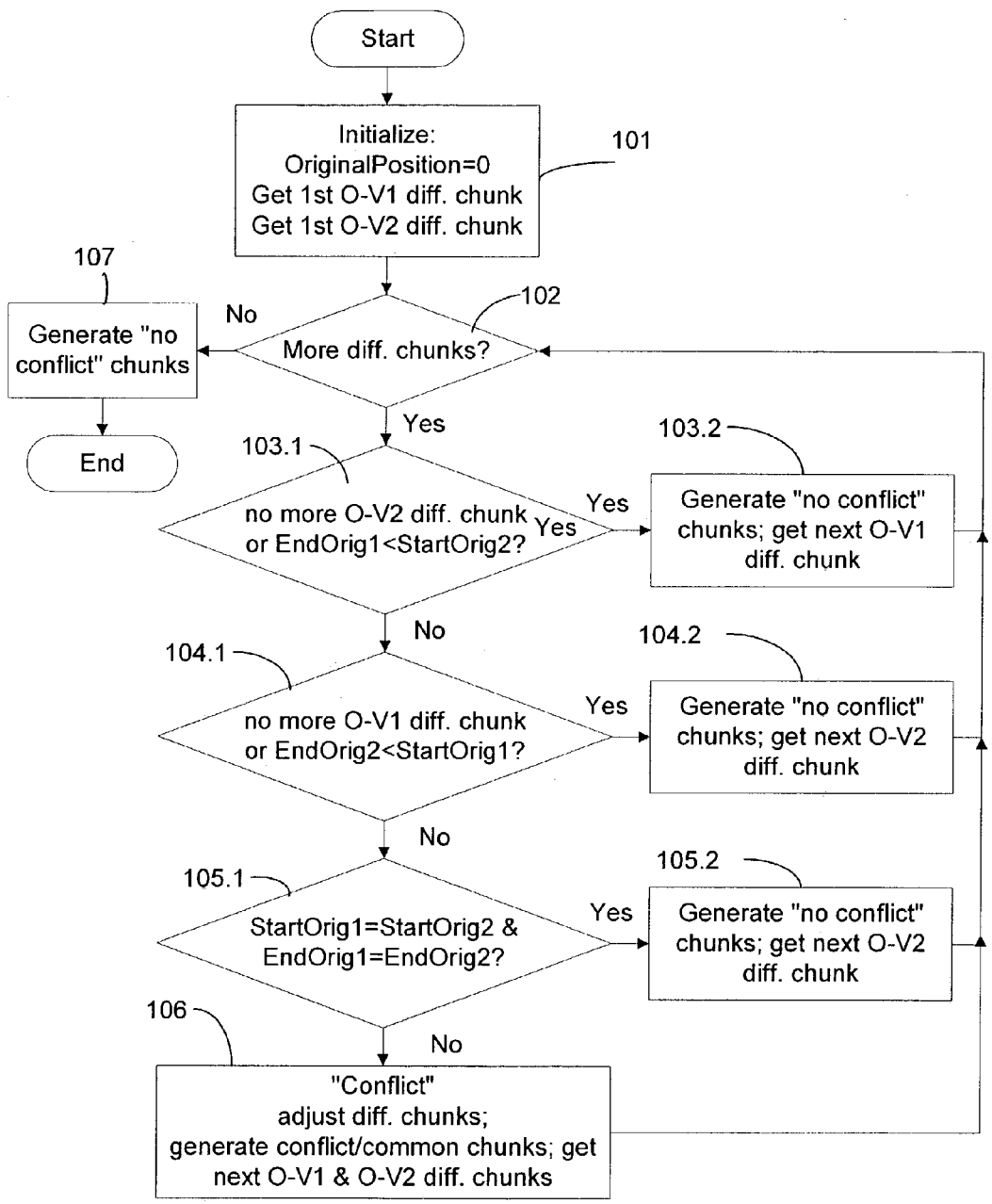
FIG. 4 is a flow diagram showing a method of generating a list of annotated chunks indicating conflicting and common parts of chunks of the documents being merged as part of the method of FIG. 3.

Referring to FIG. 4, in a preferred embodiment, the 3-way textual merge algorithm performs steps described below. For convenience of reference in the following description, the variables in a difference chunk are named as the following:
Original-Version1: {(StartOrig1,StartVer1)-(EndOrig1,EndVer1)}Original-Version2: {(StartOrig2,StartVer2)-(EndOrig2,EndVer2)}

Step 101: Initialization: set OriginalPosition to 0; get the first difference chunk between Original and Version1; get the first difference chunk between Original and Version2.

Step 102: If there are no more difference chunks, goto step 107.

Step 103: If there are no more Original-Version2 difference chunks or EndOrig1 is less than StartOrig2 then generate two resulting chunks: ["Original", (OriginalPosition-StartOrig1), "No conflict"], ["Version1", (StartVer1, EndVer1), "No conflict"]; set OriginalPosition to EndOrig1; get next difference chunk between Original and Version1; goto step 102.

Step 104: If there are no more Original-Version1 difference chunks or EndOrig2 is less than StartOrig1 then generate two resulting chunks: ["Original", (OriginalPosition-StartOrig2), "No conflict"], ["Version2", (StartVer2, EndVer2), "No conflict"]; set OriginalPosition to EndOrig2; get next difference chunk between Original and Version2; goto step 102.

Step 105: If StartOrig1=StartOrig2 and EndOrig1=EndOrig2 and lines (StartVer1-EndVer1) in Version1 are the same as lines (StartVer2-EndVer2) in Version2 then generate two resulting chunks: ["Original", (OriginalPosition-StartOrig1), "No conflict"], ["Version1", (StartVer1, EndVer1), "No conflict"]; set OriginalPosition to EndOrig1; get next difference chunk between Original and Version1; get next difference chunk between Original and Version1; goto step 102.

Step 106: Otherwise there is a conflict. In this case adjust the difference chunks so that StartOrig1=StartOrig2 and EndOrig1=EndOrig2 then generate the chunk ["Original", (OriginalPosition-StartOrig1), "No conflict"]; generate the conflict resulting chunks; set OriginalPosition to EndOrig2; get next difference chunk between Original and Version1; get next difference chunk between Original and Version2; goto step 102

Step 101: Generate one resulting chunk ["Original", (OriginalPosition-OriginalSize), "No conflict"]

It can be seen that step 106 of the 3-way merge algorithm is where chunks common to the documents are identified. This step, referred to hereinafter as "step 106 of the 3-way merge algorithm," will be considered in greater detail later.

To facilitate an understanding of the operation of the 3-way merge algorithm, an example of a merge operation without conflicts is provided here. In this example, the three sequences to be merged contain the following elements:

Original: {a,b,c,d}

Version1: {1,a,c,d}

Version2: {a,b,c,x,d}

The difference identification operation between the Original and Version1 returns the following bracketed list of "snakes": {(0,0)-(0,0)}, {(0,1)-(1,2)}, {(2,2)-(4,4)}. The corresponding list of difference chunks is {(0,0)-(0,1)}, {(1,2)-(2,2)}. The difference identification operation between Original and Version2 returns the following list of "snakes": {(0,0)-(3,3)}, {(3,4)-(4,5)}. The corresponding list of difference chunks is {(3,3)-(3,4)}(i.e. only one difference chunk exists).

Initialization gets the first difference chunks of the 2 difference chunk lists: {(0,0)-(0,1)} and {(3,3)-(3,4)}, which means StartOrig1=0, StartVer1=0, EndOrig1=0, EndVer1=1, StartOrig2=3, StartVer2=3, EndOrig2=3, EndVer2=4; and sets OriginalPosition to 0. EndOrig1 (0) is less than StartOrig2 (3), so step 103 of the 3-way merge algorithm works, and two resulting chunks are generated: ["Original", (0-0), "No conflict"] and ["Version1", (0-1), "No conflict"]. OriginalPosition is set to 0 (because EndOrig1=0); and the next difference chunk between Original and Version1 is retrieved, which is {(1,2)-(2,2)}, meaning that StartOrig1=1, StartVer1=2, EndOrig1=2, EndVer1=2. Again EndOrig1 (2) less than StartOrig2 (3), so step 103 works and 2 resulting chunks are generated: ["Original", (0-1), "No conflict"] and ["Version1", (2-2), "No conflict"]; OriginalPosition is set to 2 (because EndOrig1=2); and there are no more Original-Version1 difference chunks. As there are no more Original-Version1 difference chunks, step 104 of the merge algorithm works, and two resulting chunks are generated: ["Original", (2-3), "No conflict"] and ["Version2", (3-4), "No conflict"]. OriginalPosition is set to 3 and there are no more Original-Version2 difference chunks. As there are no more difference chunks, step 107 of the merge algorithm works and one resulting chunk is generated: ["Original", (3-4), "No conflict"] where 4 is the size of the Original sequence. As a result, the resulting chunks listed in Table III are generated. The merged sequence generated from this annotated list of chunks is {1a,c,x,d}.

TABLE III

Exemplary annotated list of chunks resulting from operation of 3-way merge algorithm.

| Chunk | Corresponding subsequence |
|---|---|
| ["Original", (0-0), "No conflict"] | <nothing> |
| ["Version1", (0-1), "No conflict"] | {1} |
| ["Original", (0-1), "No conflict"] | {a} |
| ["Version1", (2-2), "No conflict"] | <nothing> |
| ["Original", (2-3), "No conflict"] | {c} |
| ["Version2", (3-4), "No conflict"] | {x} |
| ["Original", (3-4), "No conflict"] | {d} |

Before going into the detailed description of how step 106 of the 3-way merge algorithm is carried out in a preferred embodiment, the definitions of some variables used in the operation of that step and reasons why they are used are provided here. In a preferred embodiment, a simple and effective algorithm for extracting common parts at the beginnings and ends of the sequences being merged is provided. The extraction algorithm requires comparison only of one pair and only in the case where no adjustment happens. This extraction algorithm is based on the following understandings:

a. If an adjustment of one version happens at the beginning, then the only common part at the beginning of the chunk is between the adjusted version and the Original. Moreover, a is the longest at the beginning. Symmetrically, if an adjustment happens at the end and there is no joining with next different chunks, then the only common part at the end of the chunk is between the adjusted version and the Original. Moreover, it is the longest at the end.

b. If no adjustment happens at the beginning, then the common part at the beginning of the chunk is only possible between Version1 and Version2. Symmetrically, if no adjustment happens at the end and there is no joining with next chunks, then the common part at the end of the chunk is only possible between Version1 and Version2. Thus, there may be only one common part at the beginning and there may be only one common part at the end, and the "pieces" that constitute the common parts can be unambiguously determined during the adjustment part of the 3-way merge algorithm.

These understandings form the foundation for constructing a simple and effective method used in a preferred embodiment for extracting common parts at the beginning and at the end that requires comparison only in the case when no adjustment happens and only of one pair. For doing so, a "delta" variable is introduced for each of the beginning and end sides. Specifically, "StartDelta" and "EndDelta" are defined for the beginning and end, respectively, and StartDelta=StartOrig2-StartOrig1, and EndDelta=EndOrig1-EndOrig2. When StartDelta is equal to 0, no adjustment is needed at the beginning. In that case, the common part at the beginning is possible only between Version1 and Version2, so they are compared. When EndDelta is equal to 0 and no join has happened, no adjustment is needed at the end. In that case the common part at the end is possible only between Version1 and Version2, so they are compared. When StartDelta is greater than 0, the adjustment is needed for "pieces" in the Original and Version2, so the common part at the beginning is between the Original and Version2, and the absolute value of StartDelta constitutes the length of the common part at the beginning. Thus, in this case, it is possible not only to determine which "pieces" have a common part at the beginning, but also to get the length of the common part without any comparison at all. Similarly, when StartDelta is less than 0, the adjustment at the beginning is needed for "pieces" in the Original and Version1, so the common part at the beginning is between the Original and Version1, and the absolute value of StartDelta is the length of the common part at the beginning. When EndDelta is greater than 0 and no join has happened, an adjustment at the end is needed for "pieces" in the Original and Version1, so the common part at the end is between the Original and Version1, and the absolute value of EndDelta is the length of the common part at the end. When EndDelta is less than 0 and no join has happened, an adjustment at the end is needed for "pieces" in the Original and Version1, so the common part at the end is between the Original and Version1, and the absolute value of EndDelta is the length of the common part at the end. Thus, by examining the value of StartDelta and EndDelta, it is possible to determine which "pieces" have a common part, and in four out of six cases it is even possible to get the length of the common part without any comparison.

Figure 5A:
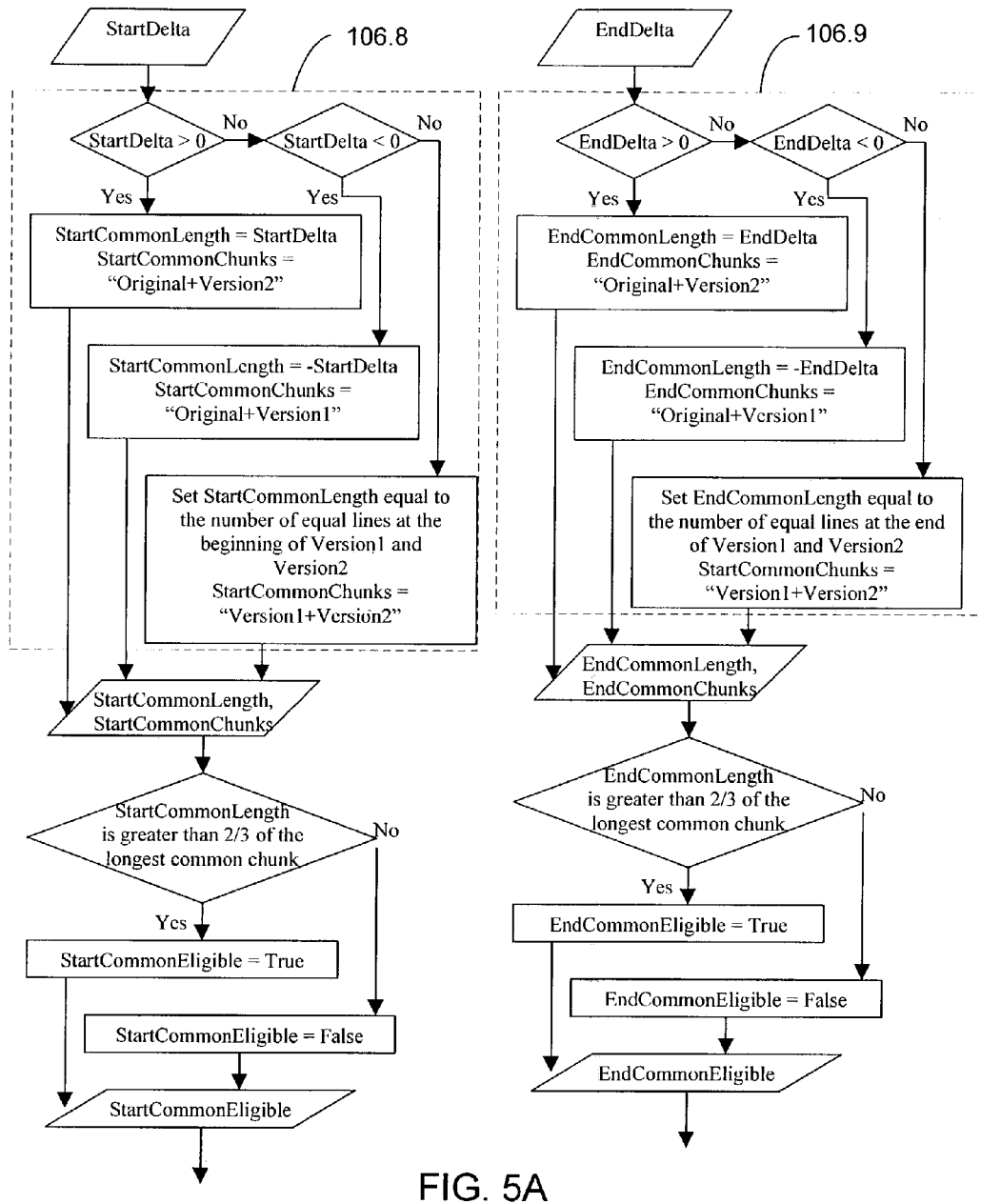
FIGS. 5A and 5B are a flow diagram showing a method of identifying common parts of conflicting chunks in accordance with an embodiment of the invention as part of the method of FIG. 4.
Figure 5B:
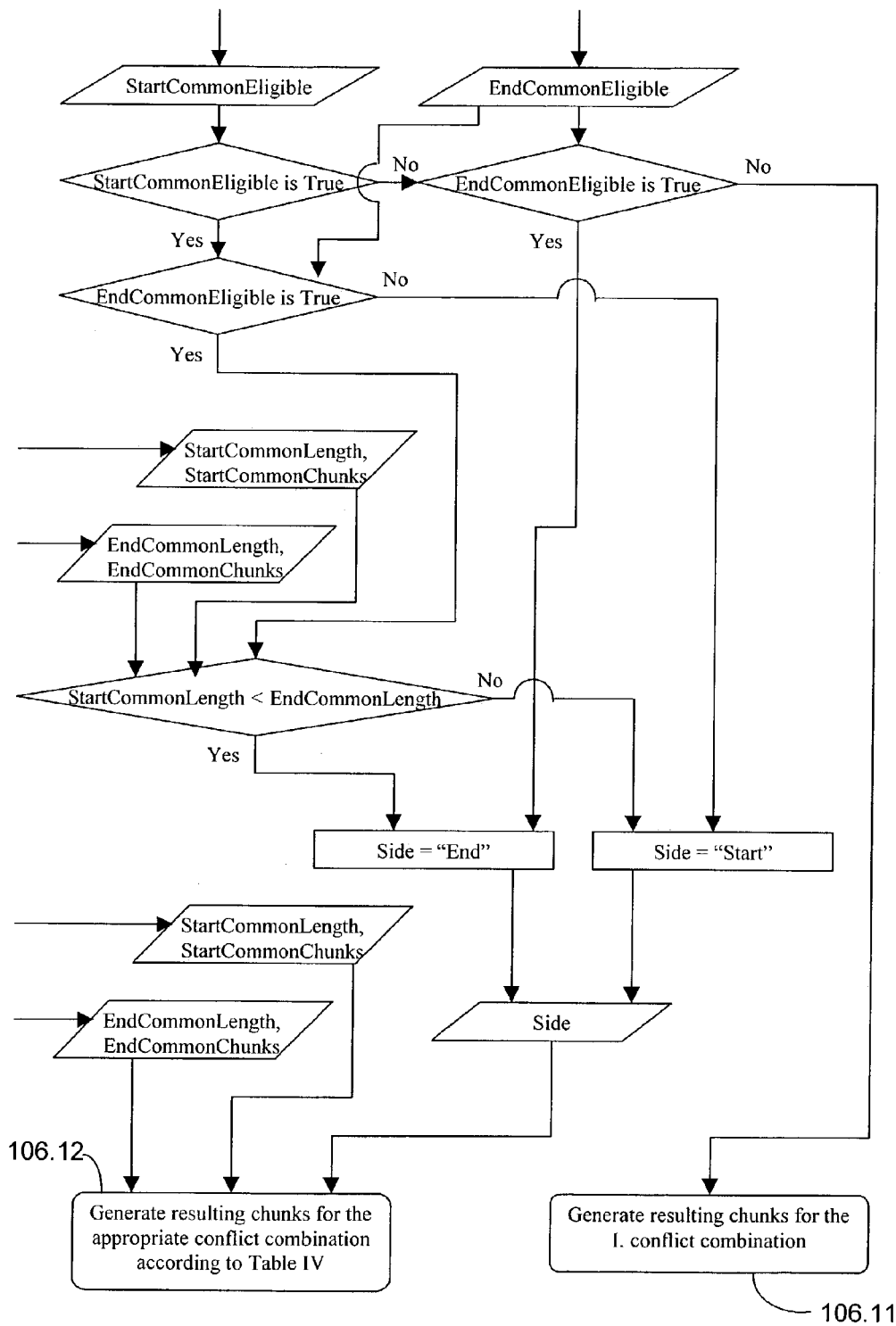

This discovery results in a simple and effective method for carrying out step 106 in the 3-way merge algorithm described above. Specifically, the method includes the following steps 106.1-106.12. For simplicity and clarity of illustration, however, only steps 106.8, 106.9, and 106.12 are shown in the flowchart of FIGS. 5A and 5B.

Step 106.1: Set StartDelta=0, set EndDelta=0

Step 106.2: If StartOrig1=StartOrig2 and EndOrig1=EndOrig2, goto step 106.8

Step 106.3: StartDelta=StartOrig2−StartOrig1. If StartDelta>0 then StartOrig2=StartOrig2−StartDelta and StartVer2=StartVer2−StartDelta else StartOrig1=StartOrig1+StartDelta and StartVer2=StartVer2+StartDelta.

Step 106.4: EndDelta=EndOrig1−EndOrig2. If EndDelta>0 then EndOrig2=EndOrig2+EndDelta and EndVer2=EndVer2+EndDelta; else EndOrig1=EndOrig1−EndDelta and EndVer1=EndVer1−EndDelta.

Step 106.5: Peek at the next Original-Version1 difference chunk, and if the NextStartOrig1 is less than or equal to EndOrig1 (i.e. the next chunk overlaps with the adjusted current difference chunk) then fetch the next difference chunk and join it with the current, i.e. the StartOrig1 and StartVer1 are taken from the current difference chunk, but EndOrig1 and EndVer1 are taken from the next difference chunk. The joined chunk becomes current.

Step 106.6: Peek at the next Original-Version2 difference chunk, if the NextStartOrig2 is less than or equal to EndOrig2 (i.e. the next chunk overlaps with the adjusted current difference chunk), then fetch the next difference chunk and join it with the current, i.e. the StartOrig2 and StartVer2 are taken from the current difference chunk, but EndOrig2 and EndVer2 are taken from the next difference chunk. The joined chunk becomes current.

Step 106.7: If a join happened on the step 106.5 or 106.6, goto step 106.4

Step 106.8: If StartDelta>0 then StartCommonLength=StartDelta, StartCommonChunks="Original+Version2"; else if StartDelta<0 then StartCommonLength=−StartDelta, StartCommonChunks="Original+Version1"; else compare Version1 and Version2 and set StartCommonLength equal to the number of equal lines at the beginning of Version1 and Version2, StartCommonChunks="Version1+Version2".

Step 106.9: If EndDelta>0 then EndCommonLength=EndDelta, EndCommonChunks="Original+Version2"; else if EndDelta<0 then EndCommonLength=−EndDelta, EndCommonChunks="Original+Version1"; else compare Version1 and Version2 and set EndCommonLength equal to the number of equal lines at the end of Version1 and Version2, EndCommonChunks="Version1+Version2".

Step 106.10: Generate the chunk ["Original", (OriginalPosition-StartOrig1), "No conflict"]

Step 106.11: If both the start and end common parts are shorter than ⅔ of the appropriate longest common chunk, then generate the I. conflict combination: ["Original", (StartOrig1-EndOrig1), "Original"], ["Version1", (StartVer1-EndVer1), "Version1"], ["Version2", (StartVer2-EndVer2), "Version2"]

Step 106.12: Otherwise, if both the start and the end common parts are long enough then take the longest of them so that there is only one eligible common part and generate one of the II.-VII. conflict combinations according to Table IV:

TABLE IV

Conflict combinations for eligible common parts.

| # | Side | Common chunks | Resulting chunks |
|---|------|---------------|------------------|
| II. | Start | Original + Version1 | ["Original", (StartOrig1 − <StartOrig1 + StartCommonLength>), "Original +Version1"], ["Original", (<StartOrig1 + StartCommonLength> − EndOrig1), "Original"], ["Version1", (<StartVer1 +StartCommonLength> − EndVer1), "Version1"], ["Version2", (StartVer2 − EndVer2), "Version2"] |
| III. | End | Original + Version1 | ["Original", (StartOrig1 − <EndOrig1 − EndCommonLength>), "Original"], ["Version1", (StartVer1 − <EndVer1 − EndCommonLength>), "Version1"], ["Original", (<EndOrig1 − EndCommonLength>−EndOrig1), "Original + Version1"], ["Version2", (StartVer2 − EndVer2), "Version2"] |
| IV. | Start | Original + Version2 | ["Original", (StartOrig1 − <StartOrig1 + StartCommonLength>), "Original +Version2"], ["Original", (<StartOrig1 + StartCommonLength>−EndOrig1), "Original"], ["Version1", (StartVer1 − EndVer1), "Version1"], ["Version2", (<StartVer2 + StartCommonLength>−EndVer2), "Version2"] |
| V. | End | Original + Version2 | ["Original", (StartOrig1 − <EndOrig1 − EndCommonLength>), "Original"], ["Version1", (StartVer1 − EndVer1), "Version1"], ["Version2", (StartVer2 − <EndVer2 − EndCommonLength >), "Version2"], ["Original", (<EndOrig1 − EndCommonLength>−EndOrig1), "Original + Version2"] |

TABLE IV-continued

Conflict combinations for eligible common parts.

| # | Side | Common chunks | Resulting chunks |
|---|---|---|---|
| VI. | Start | Version1 + Version2 | ["Original", (StartOrig1 – EndOrig1), "Original"], ["Version1", (StartVer1 – <StartVer1 + StartCommonLength>), "Version1 +Version2"], ["Version1", (<StartVer1 + StartCommonLength>– EndVer1), "Version1"], ["Version2", (<StartVer2 + StartCommonLength>– EndVer2), "Version2"] |
| VII. | End | Version1 + Version2 | ["Original", (StartOrig1 – EndOrig1), "Original"], ["Version1", (StartVer1 – <EndVer1 – EndCommonLength>), "Version1"], ["Version2", (StartVer2 – <EndVer2 – EndCommonLength>), "Version2"], ["Version1", (<EndVer1 – EndCommonLength>– EndVer1), "Version1 + Version2"] |

It should be noted that the steps 106.8, 106.9 and 106.12 are included as a result of the invention. Without the invention the type I conflict combination was always produced at the step 106.10. The simplicity of this method is achieved due to the restriction #2—without it the algorithm for calculating common parts would be more complicated and less efficient.

The following example is provided to illustrate how this method works in a merge operation with conflicts. In this example, the sequences of the Original, Version1, and Version2 are as follows:

Original: {a,b,c,d,e,f,g,h,i,j}

Version1: {1,i,2}

Version2: {a,b,c,d,e,f,g,1,2}

The operation of generating the differences between Original and Version1 returns the following list of "snakes" ("bracketed"): {(0,0)-(0,0)}, {(8,1)-(9,2)}, {(10,3)-(10,3)}. The corresponding list of difference chunks is {(0,0)-(8,1)}, {(9,2)-(10,3)}. The operation of generating the differences between the Original and Version1 returns the following list of "snakes" ("bracketed"): {(0,0)-(7,7)}, {(10,9)-(10,9)}. The corresponding list of difference chunks is {(7,7)-(10,9)}. Note that there is only one difference chunk between the Original and Version1. The Initialization step gets the first difference chunks of the two difference lists: {(0,0)-(8,1)}and {(7,7)-(10,9)}, which means StartOrig1=0. StartVer1=0, EndOrig1=8, EndVer1 1, StartOrig2=7, StartVer2=1, EndOrig2=10, EndVer2=9; and sets Original-Position to 0. EndOrig1 (8) is not less than StartOrig2 (7), so step 106 is performed. Specifically, Step 106.1: Set StartDelta=0, set EndDelta=0.

Step 106.3: StartDelta=+7; StartOrig2 is updated to be 0 and StartVer2 is updated to be 0.

Step 106.4: EndDelta=–2; EndOrig1 is updated to be 10 and EndVer1 is updated to be 3. (As a result of the adjustments, the current difference chunks look like StartOrig1=0, StartVer1 0, EndOrig1=10, EndVer1=3, StartOrig2=0, StartVer2=0, EndOrig2=10, EndVer2=9 and StartDelta=+7 and EndDelta=–2)

Step 106.5: NextStartOrig1 is 9 and it is less than EndOrig1 (10), so the next Original-Version1 difference chunk {(9, 2)-(10,3)}is fetched and joined with the current Original-Version1 difference chunk: EndOrig1 is updated to be 10 and End Ver2 is updated to be 3 (incidentally they are already equal to 10 and 3).

Step 106.6: There is no next Original-Version1 difference chunk.

Step 106.7: A join happened at the step 106.5, so goto step 106.4 step 106.4: EndDelta=0 (EndOrig1 and EndOrig2 are both equal to 10 after the adjustments and join).

Step 106.5, 106.6 , and 106.7: Nothing to do.

Step 106.8: StartDelta is +7, so StartCommonLength=1, StartCommonChunks "Original+Version2"

Step 106.9: EndDelta is 0, so the content of the Version1 and Version2 chunks needs to be compared. StartVer1 is 0, EndVer1 is 3 and StartVer2 is 0, EndVer2 is 9, so the chunks look like : Version1–{1,i,2,}, Version2-{a,b,c,d,e, f,g,1 ,2}(incidentally the chunks are equal to the whole files). The chunks have one common line at the end, so EndCommonLength=1 and EndCommonChunks= "Vesion1+Version2".

Step 106.10: Generate chunk ["Original", (0-0), "No conflict"]

Step 106.11: For the start common part the appropriate chunks are Original and Version2, Original has the length of EndOrig1–StartOrig1 10; Version2 has the length of EndVer2–StartVer2=9, so the maximum length is 10 and 7 is greater than ⅔ of 10, so the start common part is eligible. For the end common part the appropriate chunks are Version1 and Version2, the length of Version1 chunk is 3 and the length of the Version2 chunk is 9, so the maximum length is 9 and 1 is less than ⅔ of 9 and thus the end common part is not eligible.

Step 106.12: Generate the IV. conflict combination: ["Original", (0-7), "Original+Version2"], ["Original", (7-10), "Original", "version1". (0-3), "Version1"], ["Version2", (7-9). "Version2"].

As there are no more difference chunks, the step 107 of the 3-way merge algorithm works and one resulting chunk is generated: ["Original", (10-10), "No conflict"]. The resulting chunks generated are given in Table V together with their corresponding sequence elements:

TABLE V

Annotated list of chunks for example of
3-way merge with conflicts.

| Chunk | Corresponding subsequence |
| --- | --- |
| ["Original", (0-0), "No conflict"] | <nothing> |
| ["Original", (0-7), "Original + Version2"] | {a, b, c, d, e, f, g} |
| ["Original", (7-10), "Original"] | {h, i, j} |
| ["Version1", (0-3), "Version1"] | {1, i, 2} |
| ["Version2", (7-9), "Version2"] | {1, 2} |
| ["Original", (10-10), "No conflict"] | <nothing> |

The merged sequence with embedded conflict markers generated from the annotated list of Table V is then:

{">>>Original+Version2",a,b,c,d,e,f,"===Original",
h,i,j,"===Version1",1,i,2,"===Version2",1,2,"<<<End"}

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

What is claimed is:

1. A computer-readable medium having computer-executable instructions for performing steps for merging an original sequence, a first sequence, and a second sequence to form a merged sequence, the steps comprising:
   generating a first list of difference chunks between the original sequence and the first sequence, wherein generating the first list of difference chunks includes identifying a first longest common subsequence between the original sequence and the first sequence;
   generating a second list of difference chunks between the original sequence and the second sequence, wherein generating the second list of difference chunks includes identifying a second longest common subsequence of the original sequence and the second sequence; and
   deriving from the first and second lists of difference chunks an annotated list of chunks, wherein at least one chunk in the annotated list has a conflict flag indicating that said at least one chunk is a common part of the original sequence and the first sequence, the original sequence and the second sequence, or the first sequence and the second sequence.

2. A computer-readable medium as in claim 1, having further computer-executable instructions for performing the step of constructing the merged sequence from the original, first, and second sequences using the annotated list of chunks.

3. A computer-readable medium as in claim 1, wherein the original, first, and second sequences are textual documents.

4. A computer-readable medium as in claim 3, wherein each of the chunks in the annotated list contains at least one textual line.

5. A computer-readable medium as in claim 3, wherein the textual documents each contains lines of software source code.

6. A computer-readable medium as in claim 1, wherein the step of generating the first list of difference chunks includes presenting the first longest common subsequence as a first list of snakes which is used to calculate the first list of difference chunks, and wherein each snake in the first list of snakes is a subsequence of the first longest common subsequence that is contiguous in both the original sequence and the first sequence, and the step of generating the second list of difference chunks includes presenting the second longest common subsequence as a second list of snakes which is used to calculate the first list of difference chunks, and wherein each snake in the second list of snakes is a subsequence of the second longest common subsequence that is contiguous in both the original sequence and the second sequence.

7. A computer-readable medium as in claim 6, wherein the step of generating the first list of difference chunks further includes generating a first set of subsequences of the first longest common subsequence, each subsequence in said first set of subsequences being sequential in the original and first sequences, and deriving the first list of difference chunks from the first set of subsequences, and wherein the step of generating the second list of difference chunks further includes generating a second set of subsequences of the second longest common subsequence, each subsequence in said second set of subsequences being sequential in the original and second sequences, and deriving the second list of difference chunks from the second set of subsequences.

8. A computer-readable medium as in claim 7, wherein the steps of generating the first and second sets of subsequences further include bracketing the first and second sets of subsequences.

9. A computer-readable medium as in claim 1, wherein the step of generating the annotated list of chunks includes:
   retrieving a first difference chunk from the first list of difference chunks and a second difference chunk from the second list of difference chunks, the first difference chunk having a first starting position and first end position in the original sequence, and the second difference chunk having a second starting position and a second end position in the original sequence;
   calculating a start delta value as a difference between the first start position and the second start position, and an end delta value as a difference between the first end position and the second end position; and
   determining from the start delta value and the end delta value whether the first and second difference chunks share a common part.

10. A computer-readable medium as in claim 9, wherein the step of determining further determines a length of the common part from the start delta value and the end delta value.

11. A method of providing a representation of conflicts in merging an original sequence, a first sequence, and a second sequence to form a merged sequence, comprising:
   generating a first list of difference chunks between the original sequence and the first sequence, wherein generating the first list of difference chunks includes identifying a first longest common subsequence of the original sequence and the first sequence;
   generating a second list of difference chunks between the original sequence and the second sequence, wherein generating the second list of difference chunks includes identifying a second longest common subsequence of the original sequence; and
   deriving from the first and second lists of difference chunks an annotated list of chunks, wherein at least one chunk in the annotated list has a conflict flag indicating which of at least two of the original sequence, the first sequence and the second sequence said at least one chunk is a common part.

12. A method as in claim 11, further including the step of constructing the merged sequence from the original, first, and second sequences using the annotated list of chunks.

13. A method as in claim 11, wherein the original, first and second sequences are textual documents.

14. A method as in claim 13, wherein each of the chunks in the annotated list contains at least one textual line.

15. A method as in claim 13, wherein the textual documents each contains lines of software source code.

16. A method as in claim 11, wherein the step of generating the first list of difference chunks includes presenting the first longest common subsequence as a first list of snakes which is used to calculate the first list of difference chunks, and wherein each snake in the first list of snakes is a subsequence of the first longest common subsequence that is contiguous in both the original sequence and the first sequence, and the step of generating the second list of difference chunks includes presenting the second longest common subsequence as a second list of snakes which is used to calculate the first list of difference chunks, and wherein each snake in the second list of snakes is a subsequence of the second longest common subsequence that is contiguous in both the original sequence and the second sequence.

17. A method as in claim 16, wherein the step of generating the first list of difference chunks further includes generating a first set of subsequences of the first longest common subsequence, each subsequence in said first set of subsequences being sequential in the original and first sequences, and deriving the first list of difference chunks from the first set of subsequences, and wherein the step of generating the second list of difference chunks further includes generating a second set of subsequences of the second longest common subsequence, each subsequence in said second set of subsequences being sequential in the original sequence and the second sequence, and deriving the second list of difference chunks from the second set of subsequences.

18. A method as in claim 17, wherein the steps of generating the first and second sets of subsequences further include bracketing the first and second sets of subsequences.

19. A method as in claim 11, wherein the step of generating the annotated list of chunks includes:
retrieving a first difference chunk from the first list of difference chunks and a second difference chunk from the second list of difference chunks, the first difference chunk having a first starting position and first end position in the original sequence, and the second difference chunk having a second starting position and a second end position in the original sequence;
calculating a start delta value as a difference between the first start position and the second start position, and an end delta value as a difference between the first end position and the second end position; and
determining from the start delta value and end delta value whether the first and second difference chunks share a common part.

20. A method as in claim 19, wherein the step of determining further determines a length of the common part from the start delta value and the end delta value.

21. A computing device, comprising:
means for generating a first list of difference chunks between an original sequence and a first sequence which identifies a first longest common subsequence of the original sequence and the first sequence;
means for generating a second list of difference chunks between the original sequence and a second sequence which identifies a first longest common subsequence of the original sequence and the second sequence; and
means for deriving from the first and second lists of difference chunks an annotated list of chunks, wherein at least one chunk in the annotated list has a conflict flag indicating which of at least two of the original sequence, the first, sequence and the second sequence of which said at least one chunk is a common part.

22. A computing device as in claim 21, further including means for constructing the merged sequence from the original, first, and second sequences using the annotated list of chunks.

23. A computing device as in claim 21, wherein the original, first, and second sequences are textual documents.

24. A computing device as in claim 21, wherein said means for generating the first list of difference chunks presents the first longest common subsequence as a first list of snakes which is used to calculate the first list of difference chunks and wherein each snake in the first list of snakes is a subsequence of the first longest common subsequence that is contiguous in both the original sequence and the first sequence, and said means for generating the second list of difference presents the second longest common subsequence as a second list of snakes which is used to calculate the first list of difference chunks and wherein each snake in the second list of snakes is a subsequence of the second longest common subsequence that is contiguous in both the original sequence and the second sequence.

25. A computing device as in claim 24, wherein said means for generating the first list of difference chunks generates a first set of subsequences of the first longest common subsequence, each subsequence in said first set of subsequences being sequential in the original and first sequences, and derives the first list of difference chunks from the first set of subsequences, and wherein said means for generating the second list of difference chunks generates a second set of subsequences of the second longest common subsequence, each subsequence in said second set of subsequences being sequential in the original sequence and the second sequence, and derives the second list of difference chunks from the second set of subsequences.

26. A computing device as in claim 21, wherein said means for deriving the annotated list of chunks performs:
retrieving a first difference chunk from the first list of difference chunks and a second difference chunk from the second list of difference chunks, the first difference chunk having a first starting position and first end position in the first sequence, and the second difference chunk having a second starting position and a second end position in the first sequence;
calculating a start delta value as a difference between the first start position and the second start position, and an end delta value as a difference between the first end position and the second end position; and
determining from the start delta value and end delta value whether the first and second difference chunks share a common part.

27. A computing device as in claim 26, wherein the means for deriving the annotated list of chunks further determines from the start delta value and the end delta value a length of the common part.

* * * * *